US008881018B2

(12) United States Patent
Kondasani

(10) Patent No.: US 8,881,018 B2
(45) Date of Patent: Nov. 4, 2014

(54) METHOD AND SYSTEM FOR REMEDIATING NONFUNCTIONAL WEBSITE CONTENT

(75) Inventor: Thakur B. Kondasani, St. Peters, MO (US)

(73) Assignee: MasterCard International Incorporated, Purchase, NY (US)

(*) Notice: Subject to any disclaimer, the term of this patent is extended or adjusted under 35 U.S.C. 154(b) by 322 days.

(21) Appl. No.: 13/219,866

(22) Filed: Aug. 29, 2011

(65) Prior Publication Data

US 2013/0055100 A1      Feb. 28, 2013

(51) Int. Cl.
*G06F 3/00* (2006.01)
*G06F 17/30* (2006.01)

(52) U.S. Cl.
CPC ............................. *G06F 17/30887* (2013.01)
USPC ............... 715/739; 714/25; 714/38.1; 714/48

(58) Field of Classification Search
CPC .................................................. G06F 17/30887
USPC .............................. 715/739; 714/25, 38.1, 48
See application file for complete search history.

(56) References Cited

U.S. PATENT DOCUMENTS

| | | | |
|---|---|---|---|
| 6,934,697 B1 | 8/2005 | Warren | |
| 7,100,195 B1 * | 8/2006 | Underwood | 726/2 |
| 7,379,965 B2 | 5/2008 | Sherwood et al. | |
| 7,689,667 B2 * | 3/2010 | Lal | 709/218 |
| 7,818,312 B2 | 10/2010 | Broder et al. | |
| 8,732,722 B2 * | 5/2014 | Swildens | 719/310 |
| 2004/0083424 A1 | 4/2004 | Kawai et al. | |
| 2006/0112089 A1 | 5/2006 | Broder et al. | |
| 2007/0261072 A1 | 11/2007 | Boulet et al. | |
| 2008/0016025 A1 | 1/2008 | Beynon et al. | |
| 2008/0082687 A1 | 4/2008 | Cradick et al. | |
| 2008/0097977 A1 | 4/2008 | Broder et al. | |
| 2008/0097978 A1 | 4/2008 | Broder et al. | |

OTHER PUBLICATIONS

PCT Search Report and Written Opinion mailed Oct. 26, 2012; PCT Application No. PCT/US 12/52517 (9 Pages).

* cited by examiner

*Primary Examiner* — William Bashore
*Assistant Examiner* — Gregory A Distefano
(74) *Attorney, Agent, or Firm* — Armstrong Teasdale LLP

(57) ABSTRACT

A method and system for website content remediation are provided. The website content remediation computer system includes a memory device and a processor in communication with the memory device. The website content remediation computer system is programmed to determine items of nonfunctional content within a website, display a plurality of nonfunctional content types of the determined items to a user on a graphical user interface, and receive from the user a selection input of one of the displayed nonfunctional content types. The computer system is further programmed to display a report of items of nonfunctional content of the selected nonfunctional content types, receive from the user a selection input of one of the items, and receive from the user an action command that remediates the selected item.

20 Claims, 8 Drawing Sheets

METHOD AND SYSTEM FOR REMEDIATING NONFUNCTIONAL WEBSITE CONTENT

BACKGROUND OF THE INVENTION

The field of the invention relates generally to managing website content and, more particularly, to network-based methods and systems for remediating website content that is nonfunctional.

At least some known websites are used to provide information, act as a portal to access other websites or web pages, and receive information from users. Over time, editing the website can create web content within the website that is nonfunctional. For example, links may become broken when website content is moved to a different location. Such broken links may frustrate users expecting to reach certain data, but instead receive a screen indicating the data is not found. Moreover, some content may exist on the website, but may not have any link or menu option on the website that points to the content. This type of content that lacks a referencing link or menu option for accessing it is sometimes referred to as "orphan content." Such orphan content may be caused by incorrect links, absent links, or content that was moved to an incorrect location. Stale content may also frustrate users attempting to receive information from the website. Stale content is information that has become obsolete or incorrect based on the passage of time or by changes in the information that never was incorporated into the website content. Management of such nonfunctional items included within websites is time consuming and laborious.

Accordingly, it would be desirous to have a method and system to facilitate remediating nonfunctional content included within a website. For example, it would be desirous to detect broken links, orphan content, and/or stale content within a website and enable a user to easily remediate such broken links, orphan content and stale content such that these nonfunctional items are removed from the website.

BRIEF DESCRIPTION OF THE INVENTION

In one embodiment, a website content remediation computer system includes a memory device and a processor in communication with the memory device. The website content remediation computer system is programmed to determine items of nonfunctional content within a website, display a plurality of nonfunctional content types of the determined items to a user on a graphical user interface, and receive from the user a selection input of one of the displayed nonfunctional content types. The computer system is further programmed to display a report of items of nonfunctional content of the selected nonfunctional content types, receive from the user a selection input of one of the items, and receive from the user an action command that remediates the selected item.

In another embodiment, a computer-based method of remediating website content nonfunctionality includes determining a website content nonfunctional item including at least one of stale content in the website, broken links that do not point to content, and orphan content that is not associated with a link, displaying a selectable one of the at least one of stale content type, broken link type, and orphan content type to a user on a graphical user interface, and receiving from the user a selection input of one of the at least one of stale content type, broken link type, and orphan content type. The method further includes displaying a report of nonfunctional items of the selected nonfunctional item type, receiving from the user a selection input of one of the nonfunctional items, and receiving from the user an action command that remediates the selected nonfunctional item.

In yet another embodiment, one or more non-transitory computer-readable storage media having computer-executable instructions embodied thereon, wherein when executed by at least one processor, the computer-executable instructions cause the processor to determine a website content nonfunctional item including at least one of stale content in the website, broken links that do not point to content, and orphan content that is not associated with a link, display a selectable one of the at least one of a stale content type of nonfunctional item, a broken link type of nonfunctional item, and an orphan content type of nonfunctional item to a user on a graphical user interface, and receive from the user a selection input of one of the displayed types of nonfunctional items. The computer-executable instructions further cause the processor to display a report of nonfunctional items of the selected website content type nonfunctional items, receive from the user a selection input of one of the displayed nonfunctional items, and receive from the user an action command that remediates the selected nonfunctional item.

BRIEF DESCRIPTION OF THE DRAWINGS

FIG. 1 is a schematic diagram illustrating an exemplary multi-party transaction card industry system for enabling ordinary payment-by-card transactions in which merchants and card issuers do not need to have a one-to-one special relationship;

FIG. 2 is a simplified block diagram of an exemplary processing system including a plurality of computer devices in accordance with one embodiment of the present invention;

FIG. 3 is an expanded block diagram of an exemplary embodiment of a server architecture of a processing system including other computer devices in accordance with one embodiment of the present invention;

FIG. 4 illustrates an exemplary configuration of a user system operated by a user, such as the cardholder shown in FIG. 1;

FIG. 5 illustrates an exemplary configuration of a server system such as the server system shown in FIGS. 2 and 3;

FIG. 6 is a flow diagram of a method of remediating nonfunctional website content implemented using the computer system of FIG. 2 in accordance with an exemplary embodiment of the present invention;

FIG. 7 is a screen display of the website content remediation computer system shown in FIG. 2; and FIG. 8 is a schematic block diagram of the website content remediation computer system shown in FIG. 2.

DETAILED DESCRIPTION OF THE INVENTION

Figure 1:
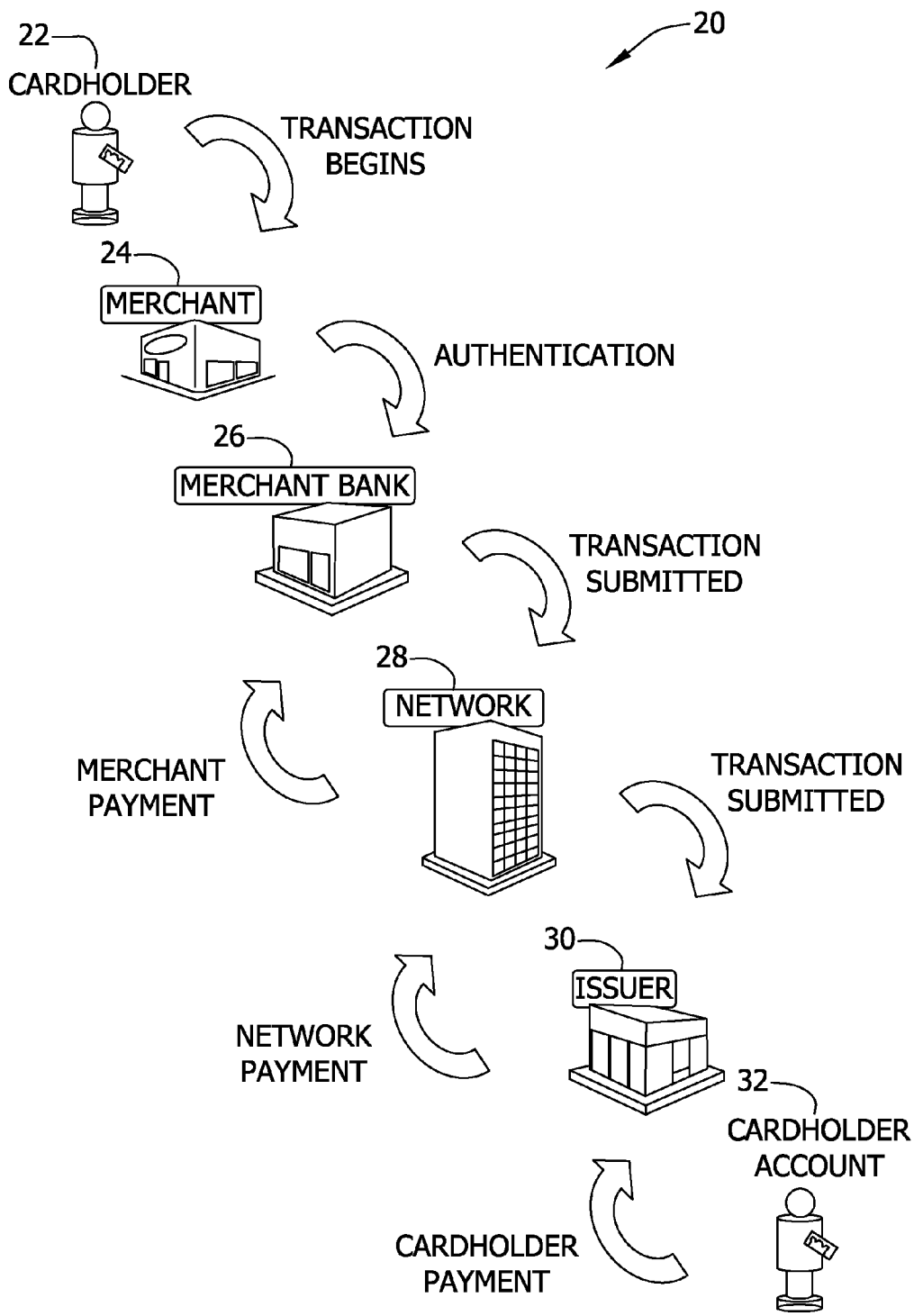
FIGS. 1-8 show exemplary embodiments of the method and system described herein.

The following detailed description illustrates embodiments of the invention by way of example and not by way of limitation. It is contemplated that the invention has general application to managing content of websites in industrial, commercial, and residential applications.

Embodiments of the methods and systems described herein relate to remediation of website content issues including for example, but not limited to, broken links, orphan content, and stale content. As used herein, "broken link" refers to any link appearing on the website which when clicked does not open a target link but instead results in a 'Page Not Found' error, "orphan content" refers to content within the website that cannot be currently accessed by a visitor due to the fact that it is not linked from any viewable content, and "stale content" refers to content that is old and possibly invalid and unused. Broken links, orphan content, stale content, and other website content problems are sometimes referred to collectively as nonfunctionalities or nonfunctional items.

Embodiments of the invention describe a three-step solution to remediate website content nonfunctionality. First, batch-mode processes or tools generate reports that show, for example, but not limited to, broken links, orphan content and stale content included within a website or a group of websites. The tools used to generate these reports are presented to the user in, for example, an XML format rendered in a browser using XSLT transformations. A Graphical User Interface (GUI) is used to present the raw data to the content-owner. Second, the GUI tool records the content-owner's decisions as made in an actions panel of the GUI tool. Third, another batch-mode process acts on the content-owner's decisions made in the actions panel of the GUI tool.

The methods and systems described herein are directed to remediating nonfunctional links or content within a website. Although the methods and systems can be used for any website having such nonfunctional links and content, the type of website described herein that the system is applied to is a website relating to managing a transaction card processing system. However, such methods and systems are not limited to such websites and they may be used to remediate nonfunctional links and content within any website or group of websites. As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an exemplary embodiment, the system is executed on a single computer system, without requiring a connection to a sever computer. In a further exemplary embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of AT&T located in New York, N.Y.). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present invention are not intended to be interpreted as excluding the existence of additional embodiments that also incorporate the recited features.

FIG. 1 is a schematic diagram illustrating an exemplary multi-party transaction card industry system 20 for enabling ordinary payment-by-card transactions in which merchants 24 and card issuers 30 do not need to have a one-to-one special relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
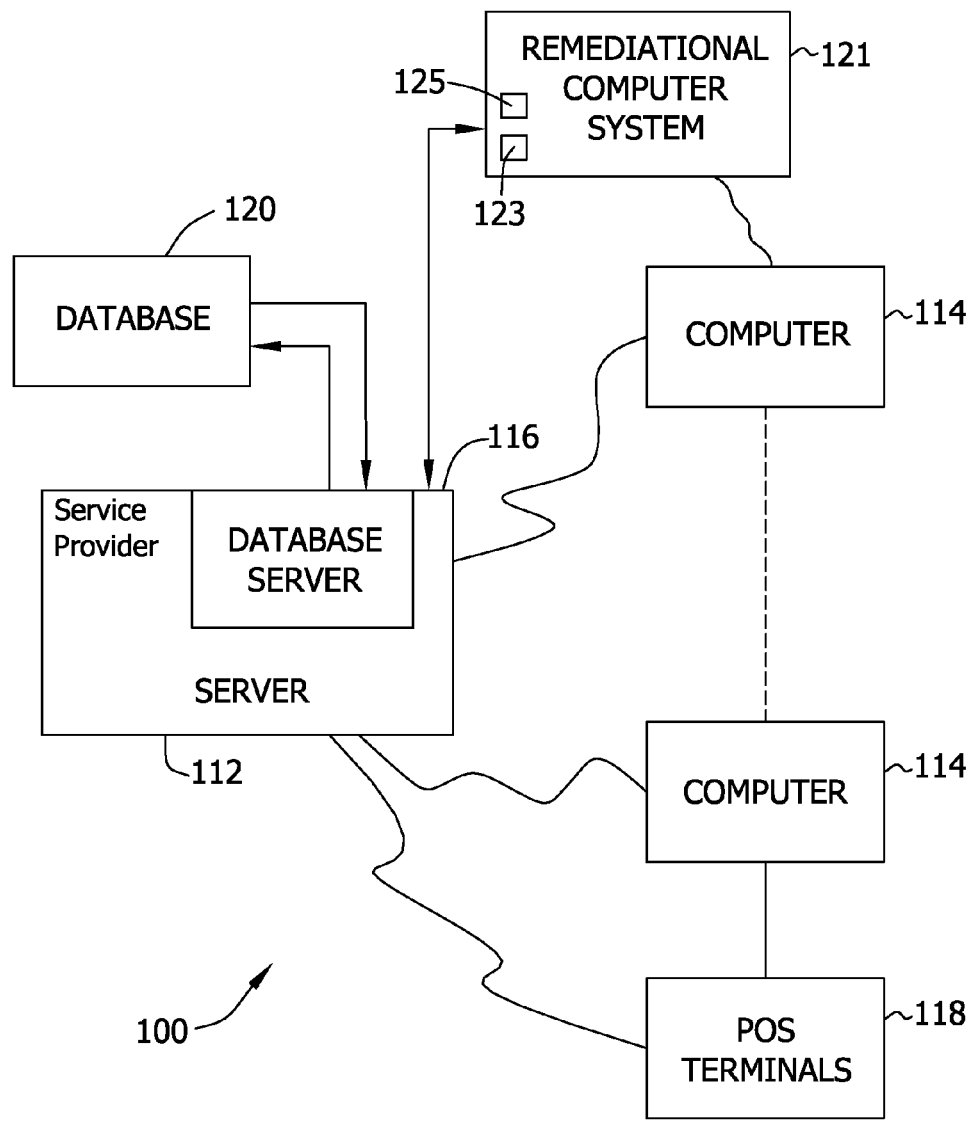

FIG. 2 is a simplified block diagram of an exemplary processing system 100 including a plurality of computer devices in accordance with one embodiment of the present invention. In the example embodiment, system 100 may be used for performing payment-by-card transactions received as of part processing the financial transaction.

More specifically, in the example embodiment, system 100 includes a server system 112, and a plurality of client subsystems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems, and special high-speed Integrated Services Digital Network (ISDN) lines. Client systems 114 could be any device capable of interconnecting to the Internet including a web-based phone, PDA, or other web-based connectable equipment.

System 100 also includes point-of-sale (POS) terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a consumer's financial transaction card.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities conducted over the processing network including data relating to merchants, account holders or customers, issuers, acquirers, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may also store informational data relating to marketing, incentive and reward programs, and statistical information relating to management of system 100.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS 118 may include a computer system associated with at least one of an online bank, a bill payment outsourcer, an acquirer bank, an acquirer processor, an issuer bank associated with a transaction card, an issuer processor, a remote payment system, and/or a biller. Further, a website content remediation computer system 121 may be included in client systems 114 or optionally may be included in server system 112. In the exemplary embodiment, website content remediation computer system 121 includes a memory device 123 and a processor 125 in communication with memory device 123. In various embodiments, website content remediation computer system 121 may be associated with a standalone processor or may be associated with a separate third party provider in a contractual relationship with interchange network 28 and configured to perform the functions described herein. Accordingly, each party involved in processing transaction data are associated with a computer system shown in system 100 such that the parties can communicate with one another as described herein.

Using the interchange network, the computers of the merchant bank or the merchant processor will communicate with the computers of the issuer bank to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

For debit card transactions, when a request for a PIN authorization is approved by the issuer, the consumer's account is decreased. Normally, a charge is posted immediately to a consumer's account. The bankcard association then transmits the approval to the acquiring processor for distribution of goods/services, or information or cash in the case of an ATM.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which is settled as a group.

The financial transaction cards or payment cards discussed herein may include credit cards, debit cards, a charge card, a membership card, a promotional card, prepaid cards, and gift cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), key fobs, or other devices, etc.

Figure 3:
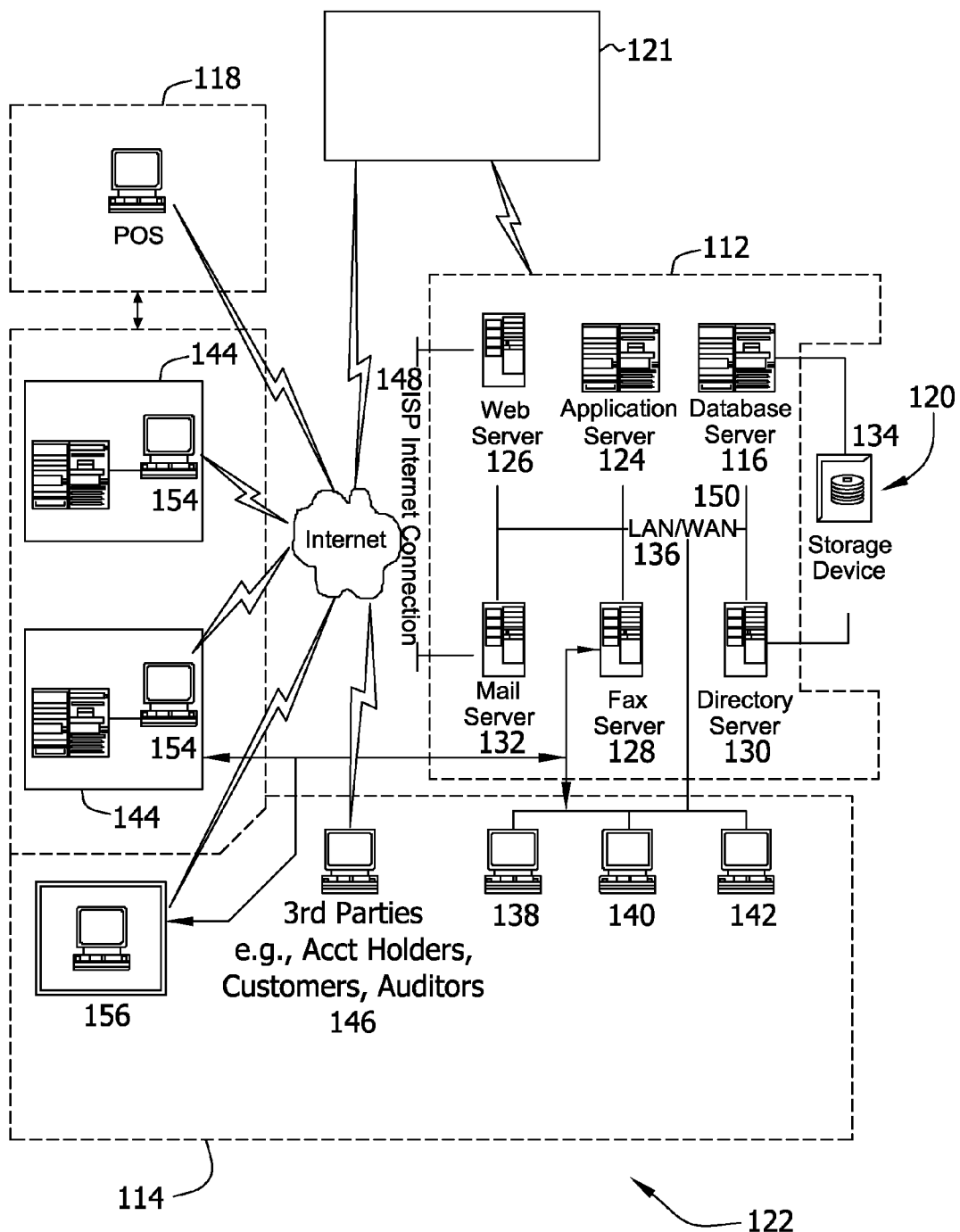

FIG. 3 is an expanded block diagram of an exemplary embodiment of a server architecture of a processing system 122 including other computer devices in accordance with one embodiment of the present invention. Components in system 122, identical to components of system 100 (shown in FIG. 2), are identified in FIG. 3 using the same reference numerals as used in FIG. 2. System 122 includes server system 112, client systems 114, and POS terminals 118. Server system 112 further includes database servers 116 and 121, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, consumers, merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
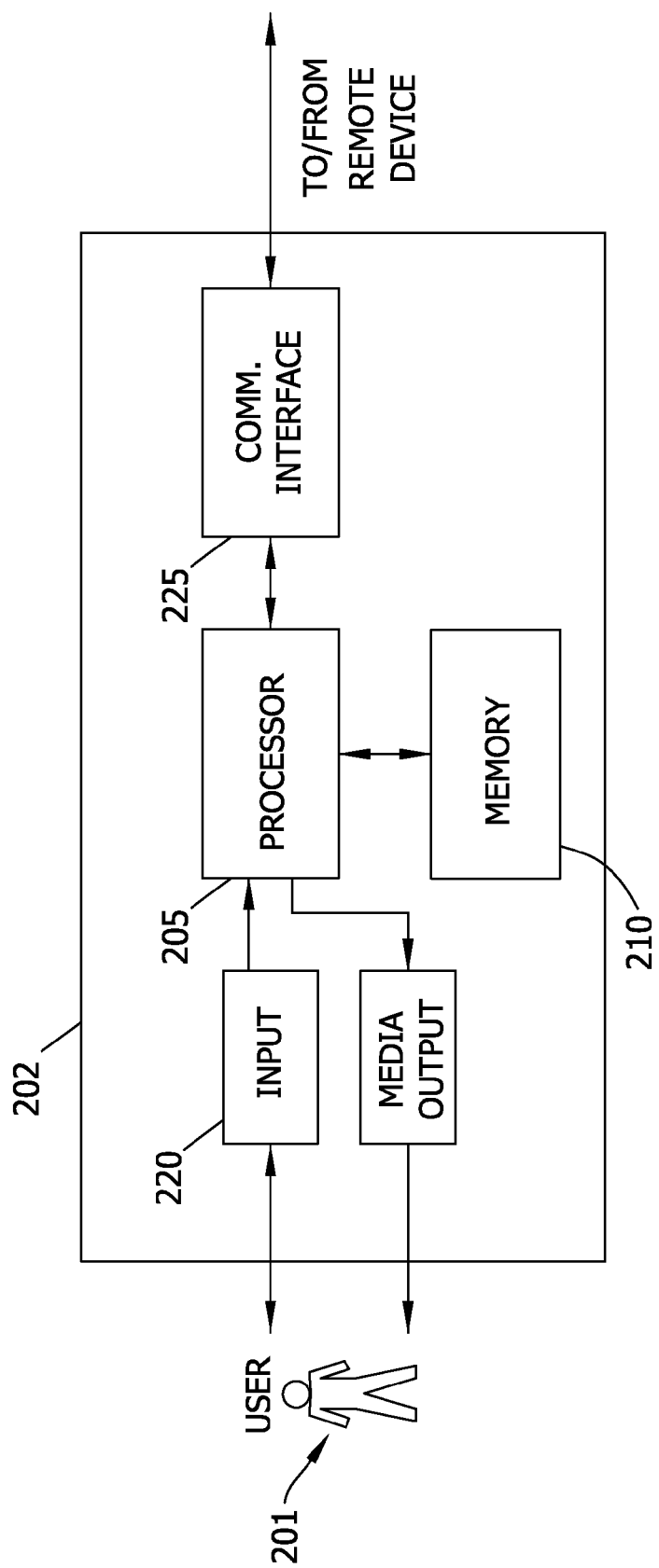

FIG. 4 illustrates an exemplary configuration of a user system 202 operated by a user 201, such as cardholder 22 (shown in FIG. 1). User system 202 may include, but is not limited to, client systems 114, 121, 138, 140, and 142, POS terminal 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
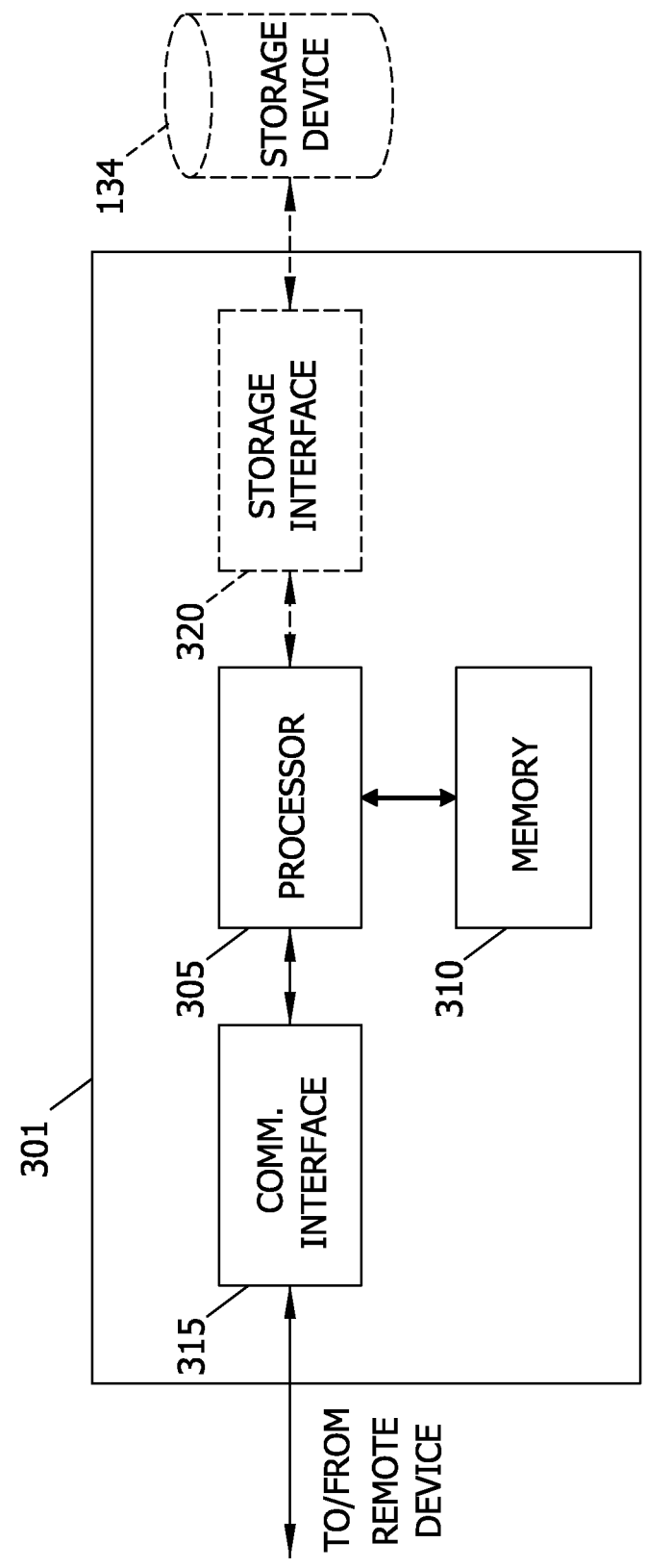

FIG. 5 illustrates an exemplary configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LENUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
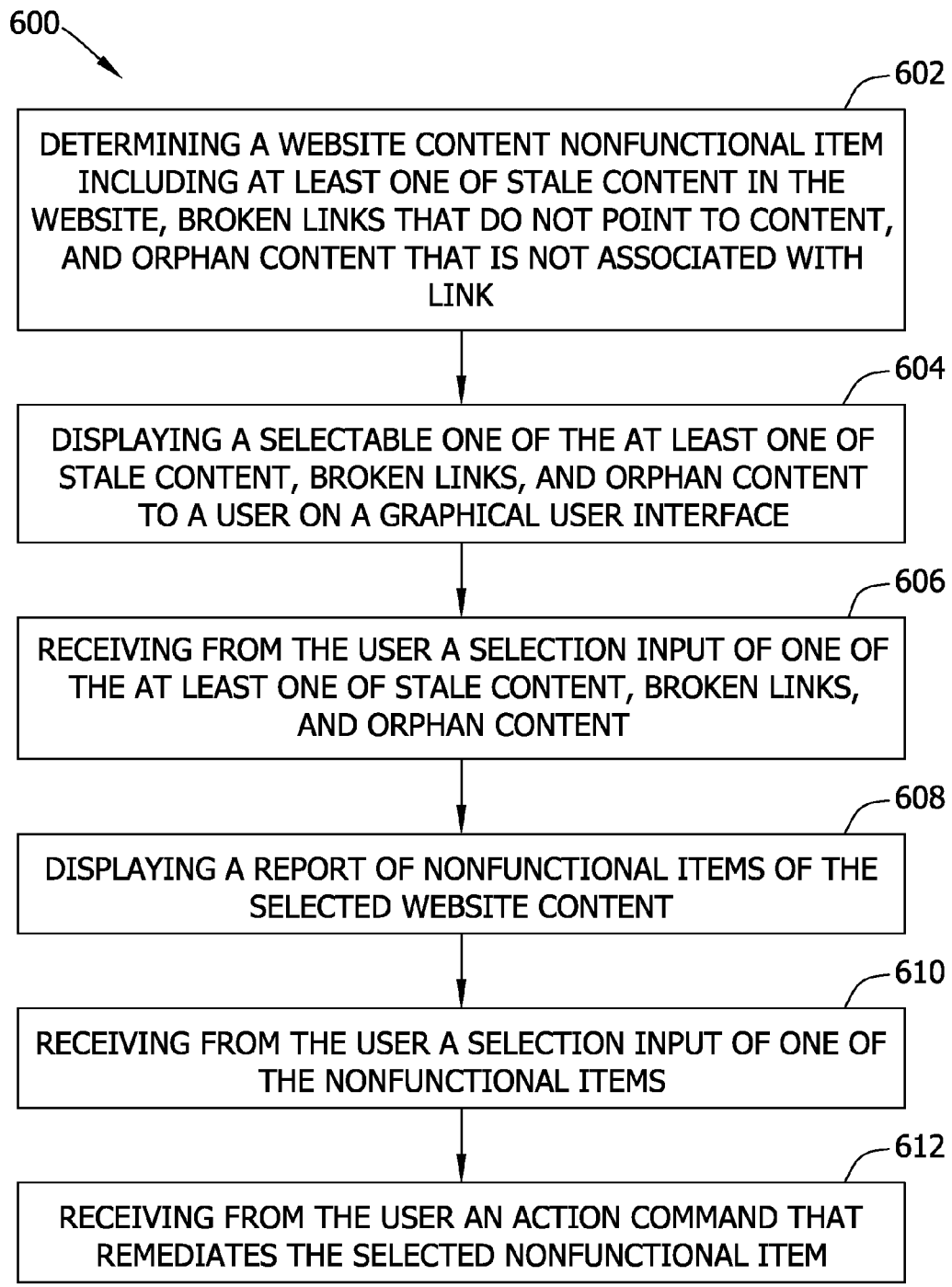

FIG. 6 is a flow diagram of a method 600 of remediating nonfunctional website content in accordance with an exemplary embodiment of the present invention. Specifically, method 600 is implemented using remediation computer system 121 (shown in FIG. 2). In the exemplary embodiment, the method includes determining 602 nonfunctional content included within a website or a group of websites including at least one of stale content in the website, broken links within the website, and orphan content that is not associated with a link within the website. The stale content includes content that has not been accessed in a predetermined previous period of time. Method 600 also includes displaying 604 a selectable item representing at least one of the stale content, the broken links, and the orphan content to a user on a graphical user interface, receiving 606 from the user a selection input of one of the items representing nonfunctional types, such as, the stale content, broken links, and orphan content, and displaying 608 a report of the selected website content nonfunctional item. Method 600 further includes receiving 610 from the user a selection input of one of the instances and receiving 612 from the user an action command that remediates the selected instance.

In the exemplary embodiment, determining nonfunctional website content is performed by executing a tool that searches the website for nonfunctional items within a website content using a predetermined algorithm associated with the type of nonfunctional item. Examples of types of nonfunctional items include, but are not limited to, broken links, stale content, and orphan content. The tool can be used with a website or a group of websites or a set of web pages within a website. In various embodiments, the tool is executed as a batch process that may be scheduled to coincide with a predetermined period of time, for example, but not limited to, coinciding with a period of relatively light use of the website or times where traffic of computing resources are being lightly used. A plurality of tools may be executed sequentially or concurrently such that each tool searches the website for nonfunctional items using a predetermined algorithm associated with the respective nonfunctional items. In various embodiments, a single tool may be programmed to determine multiple types of nonfunctional items. As used herein, types of website content nonfunctionality refer to website content nonfunctional items that exhibit similar characteristics and/or behavior and can be determined using a similar algorithm or remediated using a similar action command. Such types are displayed for selection and instances of each selected type are then displayed for remediation by an action command typically entered by a user. The user is an owner of the content. In various other embodiments, the action command is generated automatically using a rule base that can compare previous action commands entered by the user to remediate similar nonfunctional items.

In one embodiment, displaying 608 a report of nonfunctional items includes displaying a uniform resource locator (URL) of the nonfunctional items. In some cases a broken link may be remediated by simply determining the proper URL of the content to be linked to and substituting the correct URL for the incorrect URL of the broken link. Similarly, for orphan content, generating a link associated with the URL of the orphaned content may remediate an orphan content instance or deleting the orphaned content where appropriate may also remediate the orphan content nonfunctional item. To remediate stale content an indication of "mark for deletion" may be entered and the content may then be purged from memory to free the space for other content. This remediation may also then create a broken link if links still exist that point to the deleted content. Such broken links will then be determined using the broken links tool and remediated in the same manner as other broken links. In the exemplary embodiment, a batch process is executed to implement the received action commands.

In the exemplary embodiment, remediation computer system 121 includes the nonfunctional website content tools that are used to detect and remediate such nonfunctional content as broken links, stale content, and orphan content. The data associated with the website being remediated is stored in, for example, database 120 for further processing using system 121.

Figure 7:
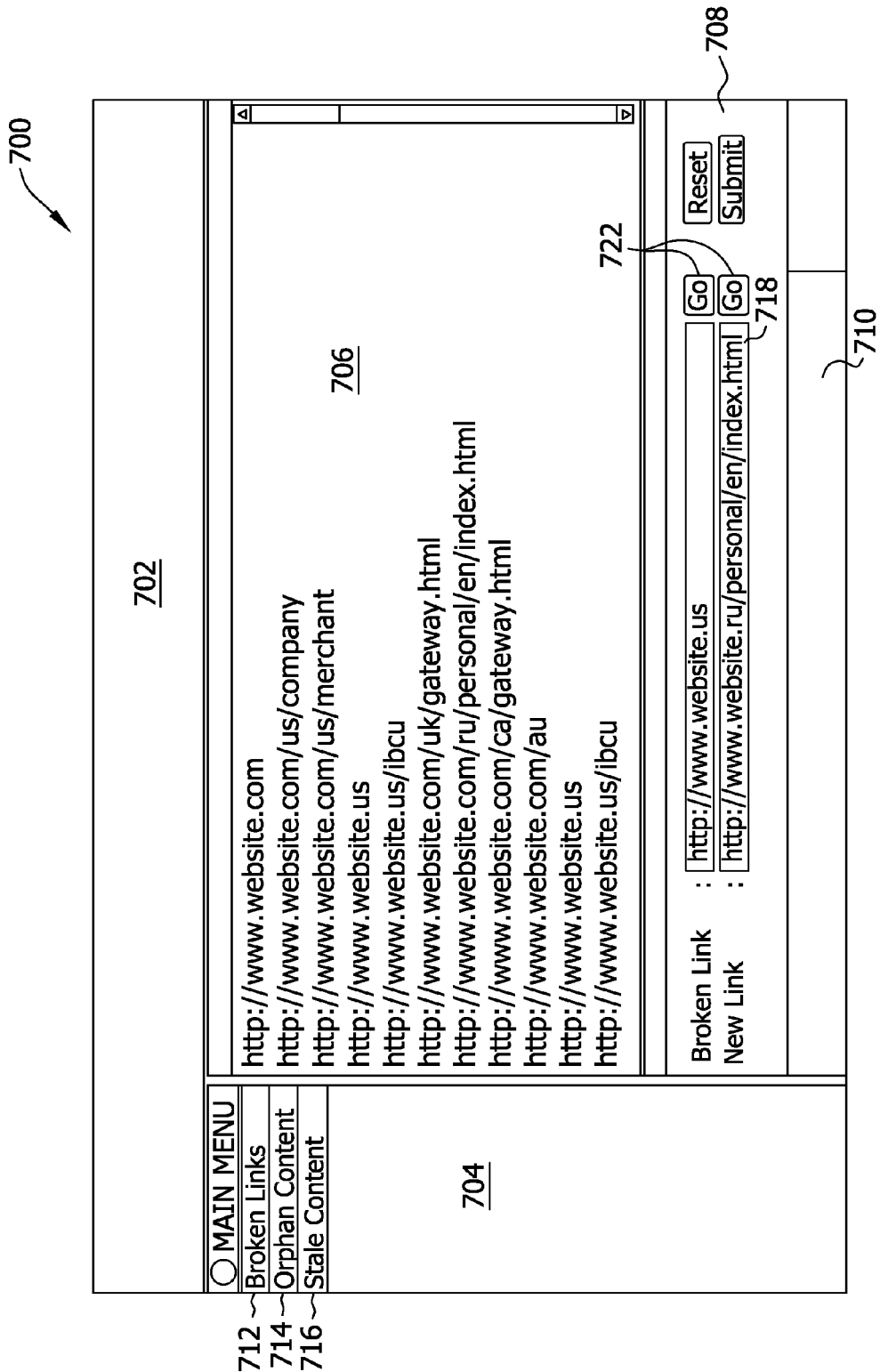

FIG. 7 is a screen display 700 of website content remediation computer system 121 (shown in FIG. 2) in accordance with an exemplary embodiment of the present invention. In the exemplary embodiment, screen display includes a header portion 702, a navigation pane 704, a report pane 706, an action pane 708, and a footer portion 710. Header portion 702 includes information selected by an interchange system business owner. Navigation pane 704 includes a selectable list of available website content nonfunctional item types. In the exemplary embodiment, a broken link selection 712, an orphan content selection 714, and a stale content selection 716 are available. In other embodiments, more or less selections may be available. For example, in one embodiment, only selections where a nonfunctional item for the respective type was found may be displayed. If no nonfunctional items for one of the possible nonfunctionality types are found, the selection for that nonfunctional item will not be displayed because no action can be taken associated with that type. In various embodiments, a number of nonfunctional items that were found are displayed next to the selection name. In other embodiments, a number of instances of a nonfunctional item are displayed so that a user is able to quickly know how many nonfunctional items need to be addressed to remediate all nonfunctional items.

When one of the nonfunctional item types is selected from navigation pane 704, report pane 706 is populated with nonfunctional items associated with the selected type. In the exemplary embodiment, all the broken links in the system are displayed in a tabular multi-row format. Action pane 708 is also populated with a predetermined action command input box 718 appropriate for the selected type. When an instance in report pane 706 is selected, an instance display box 720 is populated with the nonfunctional item selected. A go button 722 may be used to test the selected nonfunctional item or the action command in action command input box 718.

Figure 8:
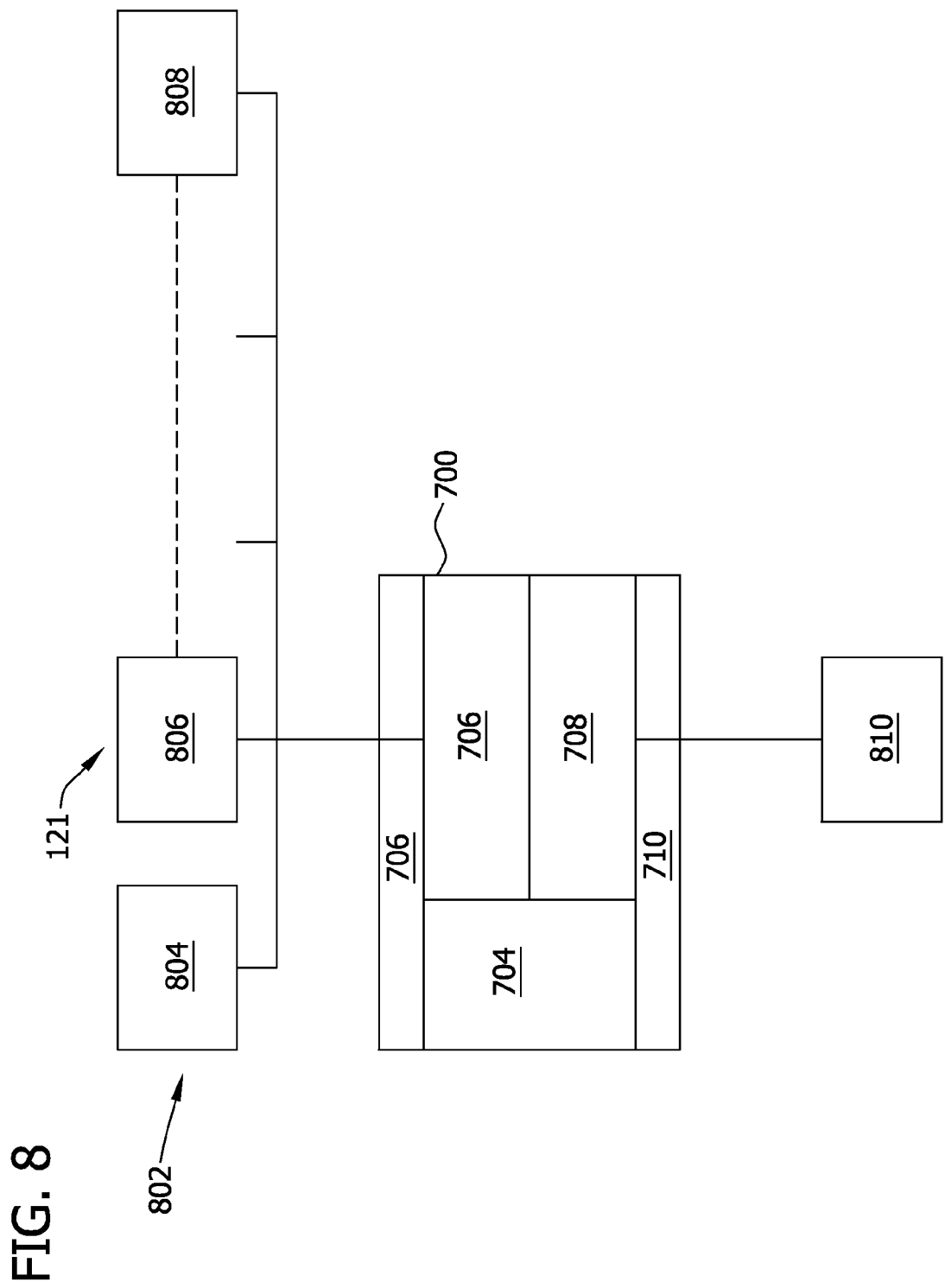

FIG. 8 is a schematic block diagram of website content remediation computer system 121 (shown in FIG. 2). In the exemplary embodiment, a plurality of processes or tools 802 such as, but not limited to, a broken link tool 804, an orphan content tool 806, and a stale content tool 808 are executed to determine respective website content nonfunctional items. The results of the tools 804, 806, and 808 are accessed by a graphical user interface represented by screen display 700. A user uses GUI 700 to remediate the nonfunctional items determined by tools 804, 806, and 808 and/or other tools that may be implemented as part of website content remediation computer system 121. A process 810 then executes to implement the action commands entered by the user to remediate the nonfunctional items found.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is for using one or more algorithms to determine a plurality of types of website content nonfunctional items, providing the determined nonfunctional items to a content owner for remediation using action commands, and executing a remediation process that implements the action commands. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The above-described embodiments of a method and system of determining website content nonfunctional items provide a cost-effective and reliable means for remediating those nonfunctional items. More specifically, the methods and systems described herein facilitate automatically locating nonfunctional items using one or more algorithms executed sequentially or concurrently, presenting instances of the found nonfunctional items to a content owner for remediation, and automatically implementing the remediation based on the content owner instructions. As a result, the methods and systems described herein facilitate managing website content in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A website content remediation computer system comprising a memory device and a processor in communication with the memory device, the website content remediation computer system is programmed to:
   receive input parameters of a first batch process configured to execute to completion without human interaction;
   receive a schedule for execution of the first batch process during a predetermined period of time coinciding with a period of less than average processor utilization;
   determine items of nonfunctional content within a website using the first batch process;
   display a plurality of nonfunctional content types of the determined items of nonfunctional content to a-content-owner on a graphical user interface;
   receive from the content-owner a selection input of one of the displayed nonfunctional content types;
   display a report of items of nonfunctional content of the selected nonfunctional content type, the report including a uniform resource locator (URL) of the items of nonfunctional content;
   receive, from the content-owner, a selection input of one or more of the items of nonfunctional content;
   receive from the content-owner an action command that remediates the selected one or more item of nonfunctional content;

receive input parameters of a second batch process configured to execute to completion without human interaction; and remediate the one or more items of nonfunctional content using the respective received action commands using the second batch process.

2. A system in accordance with claim 1, wherein the website content remediation computer system is programmed to determine items of nonfunctional content within a website including at least one of stale content in the website, broken links that do not point to content, and orphan content that is not associated with a link.

3. A system in accordance with claim 1, wherein the website content remediation computer system is programmed to execute a plurality of tools sequentially or concurrently that each searches the website for respective nonfunctional items using a predetermined algorithm associated with the respective nonfunctional items.

4. A system in accordance with claim 1, wherein the website content remediation computer system is programmed to:
  for a broken link instance receive a correct link uniform resource locator (URL);
  for an orphan content instance receive a correct link uniform resource locator (URL); and
  for a stale content instance receive an indication of mark for deletion.

5. A computer-based method of remediating website content nonfunctional items, the method implemented using a computing device having a processor in communication with a memory device, the method comprising:
  receive input parameters of a first batch process configured to execute to completion without human interaction;
  determine items of nonfunctional content within a website using the first batch process;
  determining, a website content nonfunctional item including at least one of stale content in the website, broken links that do not point to content, and orphan content that is not associated with a link using the first batch process;
  displaying a selectable one of the at least one of stale content type, broken link type, and orphan content type to a user on a graphical user interface;
  receiving from the user a selection input of one of the at least one of stale content type, broken link type, and orphan content type;
  displaying a report of nonfunctional items of the selected nonfunctional item type, the report including a uniform resource locator (URL) of the nonfunctional items;
  receiving from the user a selection input of one of the nonfunctional items;
  receiving from the user an action command that remediates the selected nonfunctional item;
  receive input parameters of a second batch process configured to execute to completion without human interaction; and
  remediating the items of nonfunctional content using the received action commands using the second batch process.

6. A method in accordance with claim 5, wherein determining a website content nonfunctional item comprises executing a tool that searches the website for instances of a website content nonfunctional item using a predetermined algorithm associated with the website content nonfunctional item.

7. A method in accordance with claim 6, wherein executing a tool comprises executing the tool as a batch process.

8. A method in accordance with claim 6, wherein executing a tool comprises executing the tool as a batch process scheduled to coincide with a predetermined period of time.

9. A method in accordance with claim 5, wherein executing a tool comprises executing the tool as a batch process scheduled to coincide with a period of time that coincides with a period of relatively light use of the website.

10. A method in accordance with claim 6, wherein determining a website content nonfunctional item comprises executing a plurality of tools sequentially or concurrently that each searches the website for nonfunctional items of a respective nonfunctional item type using a predetermined algorithm associated with the respective nonfunctional item type.

11. A method in accordance with claim 5, wherein receiving from the user a command action that remediates the selected nonfunctional item comprises for a broken link nonfunctional item receiving a correct link uniform resource locator (URL).

12. A method in accordance with claim 5, wherein receiving from the user a command action that remediates the selected nonfunctional item comprises for an orphan content nonfunctional item receiving a correct link uniform resource locator (URL).

13. A method in accordance with claim 5, wherein receiving from the user a command action that remediates the selected nonfunctional item comprises for a stale content nonfunctional item receiving an indication of mark for deletion.

14. One or more non-transitory computer-readable storage media having computer-executable instructions embodied thereon, wherein when executed by at least one processor, the computer-executable instructions cause the processor to:
  receive input parameters of a first batch process configured to execute to completion without human interaction;
  receive a schedule for execution of the first batch process during a predetermined period of time coinciding with a period of less than average processor utilization;
  determine, a website content nonfunctional item including at least one of stale content in the website, broken links that do not point to content, and orphan content that is not associated with a link using the first batch process;
  display a selectable one of the at least one of a stale content type of nonfunctional item, a broken link type of nonfunctional item, and an orphan content type of nonfunctional item to a user on a graphical user interface;
  receive from the user a selection input of one of the displayed types of nonfunctional items;
  display a report of nonfunctional items of the selected website content type, the report including a uniform resource locator (URL) of the nonfunctional items;
  receive from the user a selection input of one of the displayed nonfunctional items; and
  receive from the user an action command that remediates the selected nonfunctional item;
  receive input parameters of a second batch process configured to execute to completion without human interaction; and
  remediate the items of nonfunctional content using the received action commands using the second batch process.

15. The computer-readable storage media of claim 14, wherein the computer-executable instructions further cause the processor to execute a tool that searches the website for nonfunctional items using a predetermined algorithm associated with the website content nonfunctional item type.

16. The computer-readable storage media of claim 14, wherein the computer-executable instructions further cause the processor to execute a plurality of tools sequentially or concurrently that each searches the website for nonfunctional items of a respective website content nonfunctionality type using a predetermined algorithm associated with the respective website content nonfunctionality type.

17. The computer-readable storage media of claim 14, wherein the computer-executable instructions further cause the processor to, for a broken link nonfunctional item, receive a correct link uniform resource locator (URL).

18. The computer-readable storage media of claim 14, wherein the computer-executable instructions further cause the processor to, for an orphan content nonfunctional item, receive a correct link uniform resource locator (URL).

19. The computer-readable storage media of claim 14, wherein the computer-executable instructions further cause the processor to, for a stale content nonfunctional item, receive an indication of mark for deletion.

20. The computer-readable storage media of claim 14, wherein the computer-executable instructions further cause the processor to execute a batch process that implements the received action commands.

\* \* \* \* \*